United States Patent Office 3,253,060
Patented May 24, 1966

3,253,060
MOLDING COMPOSITIONS COMPRISING POLYVINYLIDENE FLUORIDE AND POLYMETHYL METHACRYLATE
Francis F. Koblitz, Erdenheim, Robert G. Petrella, Philadelphia, Andrew A. Dukert, Ambler, and Alkis Christofas, Philadelphia, Pa., assignors to Pennsalt Chemicals Corporation, Philadelphia, Pa., a corporation of Pennsylvania
No Drawing. Filed Aug. 3, 1964, Ser. No. 387,193
7 Claims. (Cl. 260—900)

This invention relates to polyvinylidene fluoride molding compositions.

Polyvinylidene fluoride homopolymers, in contrast to other fluorocarbon polymers, such as polytetrafluoroethylene, polychlorotrifluoroethylene, and polyvinyl fluoride, are characterized by the ease with which they may be fabricated by various molding techniques. While many other fluorocarbon polymers are difficult or impossible to mold by conventional techniques, polyvinylidene fluoride can be compression-molded, extruded, injection-molded, transfer-molded, blow-molded, etc., by techniques commonly used with other thermoplastic resins. While easily fabricated, polyvinylidene fluoride homopolymers are further characterized by the important advantages of high softening point, high thermal stability, excellent chemical resistance, toughness, and good electrical properties.

While polyvinylidene fluoride homopolymers are markedly superior, as pointed out above, to most other fluorocarbon resins in molding properties, in some instances, difficulties have been encountered because of their high melt viscosity characteristics. Although such polymers have a crystalline melting point on the order of 169° C., the melt viscosity of the polymer at this temperature is much too high to permit molding by extrusion, injection-molding, etc. Such operations require molding and extrusion temperatures well above the crystalline melting point of 169° C. in order to reduce the melt viscosity (which decreases with increasing temperature) to reasonable values. In order to obtain reasonable melt viscosities, extrusion temperatures as high as about 650° F. have often been required. Such high extrusion temperatures have the disadvantage that they approach the decomposition temperature range of the resin, and if the extrusion operation requires relatively long residence periods in the extruder at these high temperatures, the decomposition temperature of the resin might be exceeded. Such high temperatures also have the disadvantage that there is higher shrinkage factor after molding and that thermally sensitive pigments, fillers, etc., tend to decompose at these temperatures.

In attempts to lower the melt viscosity of polyvinylidene fluoride homopolymers at a given molding temperature, various plasticizers and resins were mixed with these polymers. Most of the materials tried proved to be incompatible with the polyvinylidene fluoride; they tended to form non-homogeneous mixtures as evidenced, for example, by the cloudy, opalescent nature of the blend, rather than homogeneous, essentially single-phase blends. In many cases, the physical properties were adversely affected. In the rare instances where homogeneous blends were obtained, such as with polyvinyl pyrollidone, it was found that the chemical resistance of the blend was lowered rather drastically as compared with the pure polyvinylidene fluoride homopolymer.

It has now been found, in accordance with the present invention, that the melt viscosity of polyvinylidene fluoride homopolymers may be markedly reduced, thus permitting a marked decrease in the molding temperatures, by intimately blending the homopolymer with a minor amount ranging from about 1 to 25% by weight, and preferably from 3% to 15% by weight of polymethylmethacrylate homopolymers or polymethyl methacrylate copolymers with minor amounts of other ethylenically unsaturated monomers such as other acrylates, styrene, $\alpha$-methyl styrene, acrylonitrile or the like. It has been found that these acrylate polymers form what appear to be true solid solutions with the polyvinylidene fluoride homopolymers as evidenced by the high clarity of the blends, i.e., essentially little or no trace of cloudiness or opalescence, and by the volume shrinkage that occurs when the two polymers are blended with one another. The high compatibility of polyvinylidene fluoride with these acrylates is surprising and unique, since it has been found that other fluorinated polymers such as polytetrafluoroethylene, polychlorotrifluoroethylene, and even polymers as closely related as polyvinyl fluoride, do not display this high compability with these polyacrylates.

In addition to their high degree of compatibility, the polyvinylidene fluoride-polyacrylate blends of the invention display a unique and highly valuable combination of properties. The blends display markedly lower melt viscosities, permitting molding temperatures to be lowered, e.g. by 20 to 50° C., while at the same time the softening temperature of the resin blend (which limits the service temperature of the resin) is not significantly affected. The lower molding temperatures obtained by blending minor amounts of the polyacrylate with the polyvinylidene fluoride are not average molding temperatures intermediate that of pure polyvinylidene fluoride and pure polyacrylate but rather a molding temperature approaching that of the pure polyacrylate itself. Furthermore, the improved molding properties, including lower molding temperatures, markedly improved draw-down ratios, decreased tendency to melt fracture, decreased mold shrinkage, and the like, are obtained without significant decrease in the characteristically high chemical resistance of vinylidene fluoride homopolymers, although the acrylates themselves are not characterized by high chemical resistance. Still further, the physical properties of the polymer, such as toughness and percent elongation, are likewise not significantly affected, but may even be improved in some cases. Electrical properties are likewise not significantly affected.

The vinylidene fluoride polymers useful in the molding compositions of the invention are essentially high molecular weight homopolymers of vinylidene fluoride having plasticity numbers below about 3,000 and preferably in the range of from 1500 to 2500.[1] While it is preferred to employ the essentially pure homopolymer, vinylidene fluoride copolymers containing minor amounts, e.g. up to about 5%, of other ethylenically unsaturated monomers such as tetrafluoroethylene, chlorotrifluoroethylene, ethylene, and the like, may also be used. These polyvinylidene fluoride polymers are prepared in any suitable manner, such as by the methods described in U.S. Patents 2,435,537 and 3,031,437. A preferred method for preparing these polymers is described and claimed in copending application Serial No. 32,591 filed May 31, 1960, of Murray Hauptschein now U.S. Patent Number 3,193,539.

The polymethyl methacrylate resins useful in the pres-

---

[1] The "plasticity" number is an empirical index indicating relative molecular weight of vinylidene fluoride polymers. Because of the difficulty of obtaining a true solution of the polymer, absolute molecular weight determinations have not been possible to obtain. The plasticity number is the area in square millimeters of one side of a plaque made by placing 0.5 g. of polymer powder piled in a cone between the platens of a Carver press heated at 225° C. The platens are brought together to compress the powder under slight pressure (less than 50 lbs./in.²) between the heated platens and the powder is pre-heated in this manner at 225° C. for 30 seconds. A pressure of 2500 lbs./in.² is then applied for sixty seconds at a platen temperature of 225° C. The greater the area of the plaque so produced, the lower the molecular weight of the polymer and conversely.

ent invention are the high molecular weight thermoplastic homopolymers of methyl methacrylate,

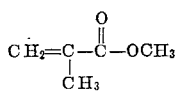

and similar high molecular weight thermoplastic copolymers of methyl methacrylate with other ethylenically unsaturated compounds wherein the comonomer makes up a minor proportion of the copolymer, preferably less than about 25 mol percent and still more desirably, less than about 10 mol percent. Suitable copolymers include, for example, those obtained by polymerizing methyl methacrylate with a minor proportion of comonomers such as ethyl methacrylate, propyl methacrylate, butyl methacrylate, ethyl acrylate, propyl acrylate, butyl acrylate, styrene, α-methylstyrene, and methacrylic acid.

Thermoplastic homopolymers of methyl methacrylate, or copolymers containing less than about 5 mol percent of another ethylenically unsaturated comonomer, are highly preferred in the practice of the present invention.

The proportion of the polymethyl methacrylate resin in physical admixture with the polyvinylidene fluoride resin is an important consideration and must be controlled within defined limits if the highly desirable combination of properties discussed above are to be attained. As stated above, the polymethyl methacrylate component should be used in amounts ranging from about 1% to 25% by weight and preferably from 3% to 15% by weight based on the total weight of the polymethyl methacrylate and polyvinylidene fluoride components. Below about 1% by weight of polymethyl methacrylate the melt viscosity of the polyvinylidene fluoride mixture is not significantly affected, while above 25% by weight of polymethyl methacrylate, the chemical resistance of the mixture begins to decrease rather markedly. In the preferred range of from about 3% to about 15% of polymethyl methacrylate, there is obtained an optimum balance of improved moldability (due to decreased melt viscosity) and retention of the high chemical resistance characteristic of polyvinylidene fluoride resins.

The physical mixing of polyvinylidene fluoride and polymethylmethacrylate resins to obtain a homogeneous solid solution or "alloy" of the two materials, is preferably obtained by heating the two materials in solid form at temperatures above their softening points and mechanically mixing. Blending temperatures of from 300 to 550° F. and especially from 375 to 500° F. are preferred. Any suitable mechanical blending operation such as milling between heated rollers such as is commonly practiced in the milling of rubber, or feeding the mixture through a screw-fed heated extruder where the mixture is subjected simultaneously to shear and compression, or mixing in a banbury, ribbon or other heated high shear mixing equipment may be employed. As the two resins are thus mechanically mixed, above their softening points, they appear to dissolve in one another to form a homogeneous solid solution or alloy which is essentially free of milkiness or opalescence. To facilitate blending, the resins may be pre-mixed in the form of a fine powder or as relatively small pellets, e.g. 1/8″ pellets.

Although it will often be most convenient and desirable to melt blend the two materials to form a homogeneous "alloy" as a separate step before utilizing the mixture as a molding composition for producing molded end items, if desired the formation of the melt blend and the production of the molded end item may also be performed in one continuous operation. This may be accomplished, for example, by feeding a mixture of the two materials in the proper proportions to a heated mixing screw where the two materials are melt blended, and then immediately delivering the hot melt to any desired type of fabricating apparatus such as an extruder, or the plenum chamber of an injection molding machine, a blow molding machine, etc.

The molding compositions of the invention comprising homogeneous, apparently single-phase physical mixtures of polyvinylidene fluoride with minor amounts of polymethyl methacrylate resins may be employed for any of the molding operations commonly applied to thermoplastic resins. Thus, they may be extruded, compression-molded, injection-molded, transfer-molded, blow-molded, or any combination of these molding operations.

The molding compositions of the invention may be mixed or blended with any of the various materials commonly used with thermoplastic resins such as dyes, pigments, plasticizers, fillers, or the like.

The following examples illustrate the invention:

EXAMPLE 1

180 parts by weight of polyvinylidene fluoride homopolymer in the form of a fine powder is blended with 20 parts by weight of a thermoplastic polymethyl methacrylate homopolymer, also in the form of a fine powder. The polyvinylidene fluoride homopolymer employed has a plasticity number (determined according to the procedure previously defined) of 1900 and has an intrinsic viscosity [2] of 1.3 in N,N-dimethylacetamide. The polymethyl methacrylate homopolymer has an intrinsic viscosity of 0.245 in toluene. After obtaining a uniform blend of the powders by mixing the powders at room temperature, the powder is fed to a two roll mill of the type used to mill rubber, the front roll of the mill operating at 320° F. and the rear roll of the mill operating at 290° F., the powder being fed between the nip of the rolls. A flux time of about four minutes is required to convert the mixed powders to a clear homogeneous banded melt. This melt is sheeted off after five minutes, rolled up and replaced endwise on the mill. The melt is milled an additional five minutes and then sheeted off in a one-sixteenth inch thick sheet. The resultant product is a translucent, nearly transparent, homogeneous physical mixture of polyvinylidene fluoride and polymethyl methacrylate containing 10% by weight of polymethyl methacrylate. It contains no signs of cloudiness or haziness, demonstrating in appearance and physical properties all the characteristics of a solid solution or alloy of the two polymers blended in a single continuous phase.

EXAMPLE 2

Example 1 is repeated except that instead of melt blending the mixed powders between the heated rolls of a mill, the powder is extruded through a screw-fed extrusion molding machine to produce a 60-mil diameter rod. The ratio of barrel length to diameter in the extruder is 24:1 at a screw rotation speed of 33 r.p.m., a rear barrel zone temperature of 350° F., a front barrel zone temperature of 400° F. and a die temperature of 450° F. The extruded rod thus obtained is a translucent, nearly transparent, homogeneous mixture of polyvinylidene fluoride and polymethyl methacrylate containing 10% by weight of polymethyl methacrylate having all the appearance and properties of a homogeneous one-phase solid solution or alloy of the two polymers.

EXAMPLE 3

Solid pellets of polyvinylidene fluoride of the same type used in Example 1, approximately 1/8″ x 1/8″, are blended with a polymethyl methacrylate polymer in the form of a fine powder and of the same type used in Example 1. This blend, containing 10% by weight of polymethyl methacrylate is fed to a plastics extruder of the type described in Example 2 and operating under essentially the same conditions to produce a homogeneous physical mixture of polyvinylidene fluoride and polymethyl methacrylate having the appearance and properties of a one-phase solid solution or alloy of the two resins.

---

[2] Determined by the methods shown in Fred W. Billmeyer, Jr., Textbook of Polymer Science, pp. 79–85, Interscience Publishers, N.Y., 1962.

EXAMPLE 4

Following the procedures described in Example 1, 95 parts by weight of a polyvinylidene fluoride homopolymer having a plasticity number of 1900 is blended with 5 parts by weight of a polymethyl methacrylate homopolymer having an intrinsic viscosity of 0.245 in toluene. A homogeneous melt blend of the two resins is obtained containing 95% by weight of polyvinylidene fluoride and 5% by weight of polymethyl methacrylate containing no signs of cloudiness or haziness and demonstrating in appearance and physical properties all the characteristics of a solid solution or alloy of the two resins blended in a single continuous phase.

EXAMPLE 5

Following the procedures of Example 1, 99 parts by weight of the same polyvinylidene fluoride homopolymer used in Example 1 is intimately mixed in powder form with 1 part by weight of the same polymethyl methacrylate homopolymer used in Example 1. The powders are melt blended as in Example 1 to produce a homogeneous physical mixture containing 1% by weight of polymethyl methacrylate having the characteristics of a solid solution or alloy of the two resins in a single continuous phase.

EXAMPLE 6

Following the procedures used in Example 1, 75 parts by weight of a polyvinylidene fluoride homopolymer having a plasticity number of 1900 and 25 parts by weight of a polymethyl methacrylate homopolymer of the same type used in Example 1 are thoroughly blended in the form of fine powders and then melt blended to produce a clear, homogeneous physical mixture of the two resins containing 25% by weight of polymethyl methacrylate. The blend displays the characteristics of a solid solution or alloy of the two resins in a single continuous phase.

EXAMPLE 7

An intimate, melt-blended, physical mixture of polyvinylidene fluoride and polymethyl methacrylate is prepared in accordance with Example 6 except that a polymethyl methacrylate is employed of somewhat higher molecular weight having an intrinsic viscosity of 0.293 in methyl ethyl ketone. A clear homogeneous "alloy" of the two resins is obtained.

EXAMPLE 8

Ninety parts by weight of a polyvinylidene fluoride homopolymer powder of the type that is used in Example 1 is mixed thoroughly with ten parts by weight of a polyacrylate in powdered form, the acrylate used being a copolymer of methyl methacrylate and butyl methacrylate containing 95% by weight of methyl methacrylate. The two powders are melt blended in the manner described in Example 1 to produce a clear, homogeneous physical mixture having all the appearance and properties of a one-phase "alloy" of the two resins.

EXAMPLE 9

90 parts by weight of a polyvinylidene fluoride homopolymer having a plasticity number of 2200 in powder form is blended with 10 parts by weight of a polyacrylate consisting of a copolymer of methyl methacrylate with ethyl acrylate and containing 90% by weight of methyl methacrylate. The two powders are melt blended to produce a homogeneous physical mixture of the two resins having the appearance and properties of a solid solution or "alloy" of the two resins.

EXAMPLE 10

85 parts by weight of a polyvinylidene fluoride homopolymer having a plasticity number of 2100 in powder form is mixed with 15 parts by weight of a copolymer, also in powder form, of 95% methyl methacrylate copolymerized with 5% of α-methylstyrene. The two powders are homogeneously melt blended to produce a homogeneous solution or "alloy" of the two resins.

EXAMPLE 11

The following runs illustrate the markedly lower melt fabrication temperatures characteristic of the polyvinylidene fluoride-polyacrylate blends of the present invention containing a minor amount of polyacrylate. In each of these runs, a molding composition as shown in Table I is extruded through a screw-type plastics extrusion machine equipped with a die having a 14° included entry angle and a 0.064" diameter exit hole. The extruder is operated at a screw rotation speed of 33 r.p.m. and with a barrel temperature and die temperature as shown in Table I. The operating temperatures indicated are the minimum necessary to give practical, smooth operation of the extrusion operation for this particular equipment.

TABLE I.—EXTRUSION MOLDING COMPARISON

| Run No. | Molding Composition | Barrel Temperature, ° F. | Die Temperature, ° F. |
|---|---|---|---|
| 11a | 100% polyvinylidene fluoride homopolymer. | 400 | 550 |
| 11b | 95% polyvinylidene fluoride—5% polymethyl methacrylate composition of Ex. 4. | 375 | 500 |
| 11c | 90% polyvinylidene fluoride—10% polymethyl methacrylate composition of Ex. 1. | 375 | 450 |
| 11d | 75% polyvinylidene fluoride—25% polymethyl methacrylate composition of Ex. 6. | 375 | 450 |
| 11e | 50% polyvinylidene fluoride—50% polymethyl methacrylate. | 350 | 450 |
| 11f | 100% polymethyl methacrylate, as used in Ex. 1. | 350 | 450 |

As shown in Table I, the pure polyvinylidene fluoride homopolymer requires an operating die temperature of 550° F. (Run 11a). A pure polymethyl methacrylate, on the other hand (11f), may be extruded at a markedly lower temperature of 450° F. die temperature. As shown in the table, the incorporation of only minor amounts of polymethyl methacrylate with the polyvinylidene fluoride results in a composition which may be extrusion shaped at substantially the same temperatures as pure polymethyl methacrylate despite the fact that the polymethyl methacrylate is only a minor proportion of the total composition. Even the inclusion of as little as 5% of the polymethyl methacrylate (Run 11b) permits a reduction in the die temperature of 50° whereas the inclusion of as little as 10% polymethyl methacrylate (Run 11c) permits extrusion temperature conditions similar to those obtainable with pure polymethyl methacrylate. The inclusion of a high proportion of polymethyl methacrylate, such as 50% (Run 11e) does not substantially lower the operating temperatures.

The advantages of operating at the lower temperatures are considerable. Extrusion temperatures of 550° F. are close to the thermal decomposition temperature of polyvinylidene fluoride resins. The sharp reduction in fabricating temperature made possible through the use of the compositions of the invention provides a greatly increased safety margin against destructive thermal decomposition during fabrication and permits the use of dyes, pigments, fillers, etc. having lower thermal decomposition temperatures.

EXAMPLE 12

Molding compositions, as shown in Table II, containing varying amounts of polyvinylidene fluoride homopolymer and polymethyl methacrylate homopolymer, are injection molded in a Van Dorn injection molding machine to produce standard ASTM specimens for tensile strength and impact strength testing. The operating temperatures and injection times are adjusted in each case to the minimum required to produce smooth, reliable operation. Injection pressure in all cases is 1,000 lbs./sq. in., the cycle charge time, 3 sec., the mold temperature, 90° F. The rear barrel temperature, front barrel temperature and nozzle temperature and the injection time required for a pure polyvinylidene fluoride homopolymer; an "alloy" containing 90% polyvinylidene fluoride and 10% polymethyl methacrylate; an "alloy" containing 50% polyvinylidene fluoride and 50% polymethyl methacrylate; and a composition consisting of pure polymethyl methacrylate are shown in Table II.

TABLE II

| Run No. | Molding Composition | Rear Barrel Temp., °F. | Front Barrel Temp., °F. | Nozzle Temp., °F. | Injection Time, Seconds |
|---|---|---|---|---|---|
| 12a | 100% polyvinylidene fluoride homopolymer. | 480 | 500 | 480 | 30 |
| 12b | 90% polyvinylidene fluoride-10% polymethyl methacrylate composition of Ex. 1. | 380 | 420 | 420 | 15 |
| 12c | 50% polyvinylidene fluoride-50% polymethyl methacrylate. | 380 | 430 | 430 | 12 |
| 12d | 100% polymethyl methacrylate | 380 | 430 | 430 | 12 |

As can be seen, the polyvinylidene fluoride homopolymer requires markedly higher temperatures and longer injection times due to the high melt viscosity of this polymer. In contrast, the incorporation of only 10% of polymethyl methacrylate reduces the molding temperatures and injection times essentially to those obtainable with the pure polymethyl methacrylate homopolymer. The molding characteristics of the composition containing 10% polymethyl methacrylate (Run 12b) did not differ substantially from those of the composition containing 50% polymethyl methacrylate (Run 12c).

EXAMPLE 13

The following example illustrates the surprisingly high chemical resistance of the molding compositions of the invention.

Chemical resistance tests to a number of common reagents as shown in Table III are made for the group of molding compositions shown in Table II ranging from 100% polyvinylidene fluoride homopolymer to 100% polymethyl methacrylate homopolymer. The tests are made by immersing standard specimens of the molding composition for 200 hrs. in the reagent at room temperature. After such immersion, the percent change in weight of the specimen is measured.

methyl methacrylate (Run 13b) display chemical resistance properties which differ only slightly from the pure polyvinylidene fluoride homopolymer. When, on the other hand, a major proportion of polymethyl methacrylate (such as 50% as in Run 13c) is incorporated with the polyvinylidene fluoride, the chemical resistance of the mixture undergoes very substantial deterioration, such that the composition is useless in many environments where the pure polyvinylidene fluoride, or polyvinylidene fluoride mixtures containing minor proportions of polymethyl methacrylate, may be usefully employed.

EXAMPLE 14

Using the injection molding machine employed in Example 12, a melt blended alloy of polyvinylidene fluoride and polymethyl methacrylate of the type described in Example 1 is extruded at a screw rotation speed of 33 r.p.m., a rear barrel zone temperature of 350° F., a front barrel zone temperature of 400° F. and a die temperature of 450° F. to produce a rod having a nominal initial diameter of 60 mils. The rod is taken up on a rotating spool at a rate higher than the linear extrusion speed, causing draw-down of the rod to produce monofilaments having diameters ranging from 14 to 50 mils. The speed of the takeup spool was increased to a maximum takeup rate corresponding to a draw-down ratio of 5:1 by diameter and 25:1 by length without filament rupture.

In contrast, when pure polyvinylidene fluoride homopolymer of the same type is extruded in the same apparatus at 75° F. higher barrel and die temperatures, the initial rod is drawn down in the same fashion, but the maximum draw-down ratios obtainable before rupture of the filament are only 3:1 by diameter and 9:1 by length.

TABLE III

| Run No. | | Percent Change in Weight on Exposure to— | | | | | | | | | |
|---|---|---|---|---|---|---|---|---|---|---|---|
| | | n-Hexane | Xylene | Trichloroethylene | Ethyl acetate | Acetone | Percent $H_2SO_4$ | Percent $HNO_3$ | Percent HCl | Glacial acetic acid | 50% NaOH |
| 13a | 100% polyvinylidene fluoride homopolymer. | +0.02 | +0.02 | +0.04 | +12.8 | +22.4 | +0.08 | +0.8 | +0.14 | +1.25 | +0.1 |
| 13b | 90% polyvinylidene fluoride-10% polymethyl methacrylate composition of Ex. 1. | +0.02 | +0.04 | +0.96 | +18.0 | +34.3 | +4.3 | +2.0 | −0.35 | +4.1 | +0.9 |
| 13c | 50% polyvinylidene fluoride-50% polymethyl methacrylate. | +0.59 | +108.7 | +39.4 | +42.5 | (¹) | +109 | +49.3 | +0.80 | +29.4 | +3.3 |
| 13d | 100% polymethyl methacrylate | >5 | (¹) | (¹) | (¹) | (¹) | (²) | (²) | >5 | (¹) | >5 |

¹Dissolved.  ² Approximately same as 13c.

As is apparent from Table III, the pure polyvinylidene fluoride homopolymer displays excellent chemical resistance to most of the reagents in which it was tested, whereas the pure polymethyl methacrylate displays little or no resistance to the same reagents. Despite the very poor chemical resistance of the polymethyl methacrylate homopolymer and the expectation that even small amounts of this homopolymer would substantially degrade the properties of the polyvinylidene fluoride homopolymer, it is found, as shown in Table III, that compositions containing a substantial, although minor, proportion of the poly-

EXAMPLE 15

The compositions of the invention are tested against pure polyvinylidene fluoride and pure polymethyl methacrylate for percent elongation at break. The tests are conducted according to standard ASTM test procedure (D1708–59T). The results are shown in Table IV. Despite the fact that pure polymethyl methacrylate has poor elongation characteristics, the incorporation of as much as 25% of the polyacrylate with the polyvinylidene fluoride homopolymer had no deleterious effect on this important characteristic.

TABLE IV

| Molding Composition | Percent Elongation at Break |
|---|---|
| 100% polyvinylidene fluoride homopolymer | 350 |
| 90% polyvinylidene fluoride-10% polymethyl methacrylate composition of Ex. 1 | 350 |
| 75% polyvinylidene fluoride-25% polymethyl methacrylate composition of Ex. 6 | 360 |
| 100% polymethyl methacrylate | 3.6 |

EXAMPLE 16

The composition of Example 1 is compared in flex resistance to pure polyvinylidene fluoride homopolymer and pure polymethyl methacrylate homopolymer and the results are shown in Table V. The flex life measurements are made using 10 mil thick x ½ in. wide samples on the MIT Folding Endurance Tester under a 1 kg. load. Despite the fact that the pure polyacrylate has essentially zero flex resistance (sample broke on the first flex cycle), the blend of the polyacrylate with polyvinylidene fluoride shows a flex resistance which is improved over the pure polyvinylidene fluoride homopolymer.

TABLE V

| Molding Composition | Flex Resistance |
|---|---|
| 100% polyvinylidene fluoride homopolymer. | 1,971±600 (air quenched), 1,323±139 (0° C. water quenched). |
| 90% polyvinylidene fluoride-10% polymethyl methacrylate composition of Ex. 1. | 2,192±600 (air quenched), 5,547±1,200 (0° C. water quenched). |
| 100% polymethyl methacrylate | Zero. |

EXAMPLE 17

Example 3 is repeated using a blend of pellets of polyvinylidene fluoride with pellets of an extrusion grade polymethyl methacrylate. The extrusion grade resin has an intrinsic viscosity of 0.292 in methyl ethyl ketone. The properties of the extruded alloy are shown below.

Composition:
  90% polyvinylidene fluoride
  10% polymethyl methacrylate

*Physical properties of alloy*

Vicat softening point: 151° C.
Specific gravity: 1.676±0.002
Molding temperatures: 375–450° F.
Extrusion temperatures: 375–500° F.
Mold shrinkage, average: 0.012 in./in.
Colorants: All classes of pigments
Machining qualities: Excellent
Flammability: Non-flammable, slight dripping
Shore D hardness: 75–80
Tensile strength (75° F.):
  5450 p.s.i. (yield)
  6230 p.s.i. (break)
Elongation at rupture (75° F.): 359%
Volume resistivity, ohm-in.: $2.2 \times 10^{15}$
Clarity and color: White, nearly transparent
Tensile impact (75° F.): 95 ft.-lb./in.$^2$
Flex resistance, MIT (10 mil sheet) air quenched: 2192 ±600 (R.T.) 0° C. Water quenched: 5547 ±1200
Heat stability:
  1 hour 700° F. Sample destroyed
  1 hour 518° F. 1.14% weight loss
  96 hours 300° F. 0.17% weight loss Chemical resistance: Percent change after two weeks exposure at room temperature:

| | Length | Width | Thickness | Weight |
|---|---|---|---|---|
| Pyridine | +6.51 | +7.09 | +9.76 | +14.00 |
| Nitric acid | +1.98 | +3.12 | +2.38 | +6.92 |
| n-Butylamine | +0.24 | 0 | +4.65 | −1.48 |
| Sulfuric acid | +0.86 | +0.78 | +7.15 | +7.94 |
| Hydrochloric acid | +0.37 | 0 | 0 | +0.27 |
| Glacial acetic acid | +0.86 | +1.51 | +4.76 | +3.57 |
| Hexane | 0 | +0.78 | +1.19 | 0 |
| Xylene | 0 | 0 | +1.19 | +0.21 |
| Ethyl acetate | +8.60 | +6.25 | +7.15 | +14.82 |
| Trichlorethylene | 0 | +0.78 | 0 | +0.94 |
| Acetone | +12.52 | +11.30 | +13.96 | +19.35 |
| 50% sodium hydroxide | 0 | 0 | 0 | +0.11 |
| Distilled water | −0.12 | +0.76 | +2.38 | +0.16 |

Solution properties: (20% weight in DMAC)[1]
  Shelf life—unlimited
  Viscosity—Brookfield viscometer—
    6 r.p.m. 16,500 c.p.s.
    60 r.p.m. 7,400 c.p.s.
Brabender Plasticorder values:

| Time, minutes | Torque, meter-grams | Temperature Difference, ° C. |
|---|---|---|
| 0 | 3,845 | 0 |
| 5 | 3,310 | +16 |
| 10 | 3,000 | +17 |
| 15 | 2,885 | +16 |
| 20 | 2,465 | +15 |
| 25 | 2,352 | +14 |

Sample dried 24 hours—100° C.—25 inches vacuum

| | | |
|---|---|---|
| 0 | 3,969 | 0 |
| 5 | 3,347 | +17 |
| 10 | 2,975 | +18 |
| 15 | 2,691 | +17 |
| 20 | 2,490 | +16 |

[1] Dimethylacetamide.

EXAMPLE 18

Using a wire coater extruder, computer wire was insulated with various polymers. The extruder was a one-inch diameter; 20/1 L/D screw: 2/1 compression ratio with gradual compression along the feeding and compression section screw. The melt emerges around the wire through an annular space of 0.060″ I.D., 0.120″ O.D., and is drawn down on number 24 (0.020″) silver plated copper wire to form the thinnest possible insulation which will withstand 2,000 volts without breakthrough, and without any noticeable roughness. The lowest outside diameter of insulated wire which has been obtained under the conditions shown with polyvinylidene fluoride was considered as the highest draw ratio possible for this particular polymer. As can be seen from Table VI which follows, the addition of polymethyl methacrylate makes possible further drawing of the melt.

TABLE VI

| Polymer | A[1] | B[2] | C[3] |
|---|---|---|---|
| Extruder Barrel Temperatures, ° F.: | | | |
| Zone I | 480 | 400 | 400 |
| Zone II | 480 | 400 | 400 |
| Zone III | 480 | 400 | 400 |
| Crosshead Temperature, ° F | 500 | 450 | 450 |
| Tip of Forming Die Temp., ° F | 750 | 450 | 450 |
| Critical O.D. (inch) (smallest possible O.D. of insulation with smoothness) | 0.36 | .033 | 0.31 |
| Smoothness | (4) | (4) | (4) |
| Bond Strength (Insulation to wire) | (4) | (4) | (4) |
| R.p.m. | 3.5 | 3.5 | 25 |
| Pressure (p.s.i.) | 1,950 | 2,900 | |
| Output (ft./min.) | 20 | 32 | 120 |

[1] 100% Polyvinylidene Fluoride Homopolymer.
[2] Polyvinylidene Fluoride-10% Polymethyl methacrylate.
[3] 95% Polyvinylidene Fluoride-5% Polymethyl methacrylate.
[4] Acceptable.

We claim:

1. A molding composition comprising a homogeneous physical mixture of polyvinylidene fluoride and a solid polymethyl methacrylate resin, said composition containing from 1% to 25% by weight of said mixture of said polymethyl methacrylate resin.

2. A molding composition according to claim 1 in which said mixture contains from 3% to 15% by weight of said mixture of said polymethyl methacrylate resin.

3. A molding composition comprising a homogeneous physical mixture of a polyvinylidene fluoride homopolymer having a plasticity number of less than about 3000 and a solid thermoplastic polymethyl methacrylate homopolymer, said composition containing from about 1% to about 25% by weight of said mixture of said polymethyl methacrylate homopolymer.

4. A molding composition in accordance with claim 3 in which said polyvinylidene fluoride homopolymer has a plasticity number of from 1500 to about 2500.

5. A molding composition in accordance with claim 3 in which said composition contains from about 3% to about 15% by weight of said polymethyl methacrylate homopolymer.

6. A homogeneous physical mixture of polyvinylidene fluoride and a solid polymethyl methacrylate resin wherein said polymethyl methacrylate resin is present in an amount from 1 to 25% by weight of said mixture.

7. A composition comprising a homogeneous physical mixture of polyvinylidene fluoride and a solid polymethyl methacrylate homopolymer wherein the polymethyl methacrylate is present in said mixture in an amount from about 1% to about 25% by weight.

References Cited by the Examiner

UNITED STATES PATENTS

| | | | |
|---|---|---|---|
| 2,326,543 | 8/1943 | Macht | 260—901 |
| 3,054,761 | 9/1962 | Moore et al. | 260—900 |

FOREIGN PATENTS 523,788  4/1956  Canada.

MURRAY TILLMAN, *Primary Examiner.*

J. WHITE, *Assistant Examiner.*